June 19, 1945.  J. C. KURTZ  2,378,487

OPTICAL INSTRUMENT

Filed April 15, 1944

JOHN C. KURTZ
INVENTOR

BY

ATTORNEYS

Patented June 19, 1945

2,378,487

UNITED STATES PATENT OFFICE 2,378,487

OPTICAL INSTRUMENT

John C. Kurtz, Irondequoit, N. Y., assignor to Bausch & Lomb Optical Company, Rochester, N. Y., a corporation of New York Application April 15, 1944, Serial No. 531,249

4 Claims. (Cl. 88—33)

This invention relates to optical instruments and more particularly it has reference to means for mounting optical elements such as lenses, mirrors and prisms.

In optical instruments such as prism binoculars, for example, it is customary to mount a prism on each side of an apertured table which is secured within the body of the instrument. For the proper functioning of such instruments, it is essential that the prisms be held in accurate alignment with each other and that they be secured to the table without straining or deforming either the prisms or the table.

It is an object of the present invention to provide improved means for mounting optical elements on a table or plate. Another object is to provide means for equalizing the forces which hold optical elements against the respective sides of a plate or table so as to reduce the chance of distorting the seats for the elements. These and other objects and advantages reside in certain novel features of construction, arrangement and combination of parts as will hereinafter be more fully described and pointed out in the appended claims.

Referring to the drawing.

Figure 1:
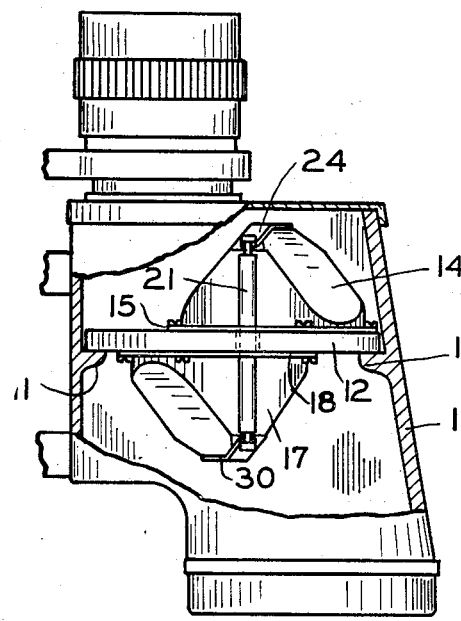
Fig. 1 is a view of a binocular tube, with parts broken away, showing the application of my invention to a prism table.
Figure 4:
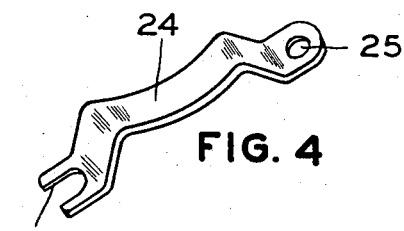
Fig. 4 is a perspective view of the resilient clamping member.
Figures 2, 3:
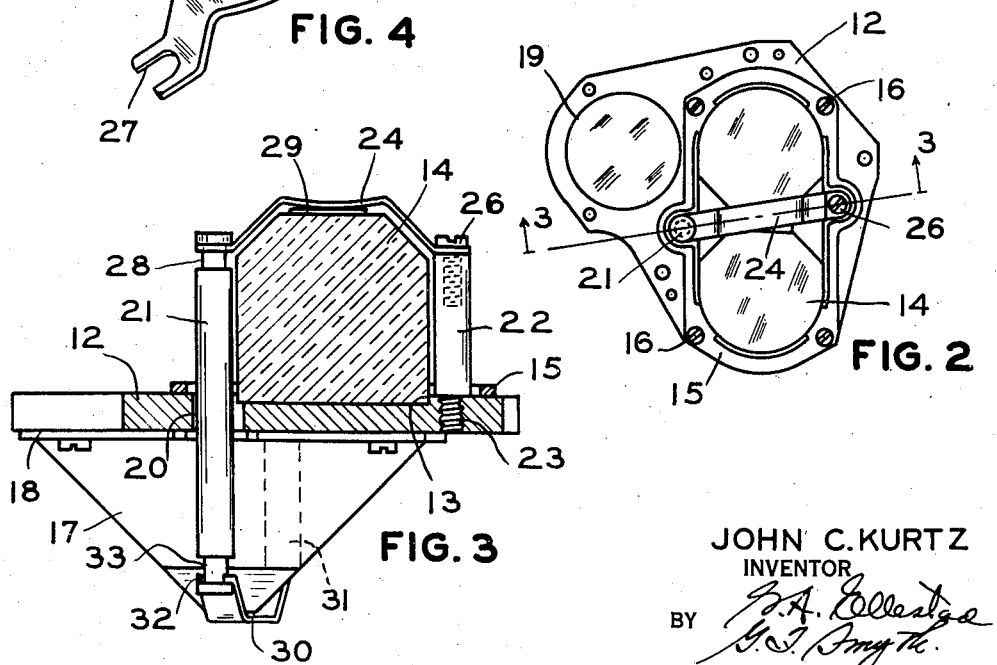
Fig. 2 is a top plan view of the prism table.
Fig. 3 is a sectional view taken on line 3—3 of Fig. 2.

One embodiment of my invention is shown in the drawings as applied to a prism binocular body 10 having the integral lugs 11 for supporting a prism table 12. The upper side of table 12 is recessed as at 13 to provide a seat for receiving the reflecting prism 14. Any suitable means such as the collar 15, attached to the table 12 by screws 16, may be used for securing the prism 14 in accurate lateral position. Another prism 17 is similarly mounted on the under side of the table in a recessed seat, not shown, and held in lateral adjusted position by collar 18. The table 12 is provided with apertures 19 opposite the prism faces so that light rays may enter the prism system and emerge from it after successive reflections, as will be understood by those skilled in the art.

Slidably mounted in an aperture 20 in plate 12 is the post 21 which extends along the sides of the prisms 14 and 17 carried on opposite sides of the table 12. A pillar 22, rigidly secured to table 12 by screw threads 23, extends upwardly from the table along the outer side of prism 14. The prism 14 is held against its seat by a resilient member 24 having at one end an opening 25 for securing it to pillar 22 by screw 26 and having at the other end a fork portion 27 which cooperates with a reduced portion or neck 28 on the upper end of post 21. A pad 29 of cork, paper or any other suitable material may be positioned between the top of the prism and the resilient member 24. The prism 17 is similarly held against its seat by the resilient member 30 having one end secured to a pillar 31 attached to plate 12 and another end having a forked portion 32 engaging a reduced portion or neck 33 on the lower end of post 21.

The aperture 20 in table 12 is preferably made slightly larger in diameter than the post 21 so that the latter may not only slide freely therein but may also have a slight lateral movement. Since the resilient members 24 and 30 are connected to the respective ends of the rigid post 21, the latter will float or move so as to tend to equalize the forces exerted by the resilient members to hold the two prisms against their seats. Without such a structure, the forces exerted on the prism seats often cause a distortion of the seats and consequent improper location of the prisms. The mounting and assembly of the prisms is greatly facilitated by my structure since critical adjustment of the resilient prism holding devices is not required. Various applications and modifications can obviously be made without departing from the spirit of my invention.

I claim:

1. In an optical instrument, the combination of a table having apertures therein, an optical element positioned against each face of the table opposite the apertures, resilient means on each side of the table for holding each element against the table and a movably mounted rigid member, said member having portions connected, respectively, to the resilient means on each side of the table whereby the tension on the optical elements is equalized.

2. In an optical instrument, the combination of a table having apertures, an optical element positioned against each of the two faces of the table and in alignment with the apertures, means for securing the elements to the table, said means comprising a post extending through an aperture in said table and positioned adjacent each of the elements, said post being freely movable in said aperture, and resilient means engaging each element for holding it against the table, said resilient means being secured to each end portion of the post.

3. In an optical instrument, the combination of a table having apertures, an optical element positioned against each face of the table and in alignment with the apertures, a resilient member for holding each element against the table, and a post slidably mounted in an aperture in the table, each member having a portion rigidly held to the table and a portion secured to said post whereby the forces holding the elements against the table are equalized.

4. In an optical instrument, the combination of a table having a recessed seat formed on each side thereof, said table having apertures adjacent the seats, a prism mounted in each seat and in alignment with the apertures, pillars rigidly secured to the respective sides of the table and located adjacent the prisms, a post slidably mounted in an aperture in the table and extending along a side of each prism, a resilient member engaging each prism for holding it in its seat, each member having one end secured to the adjacent pillar and the other end secured to the adjacent end of the post whereby the forces holding the prisms in the seats tend to be equalized.

JOHN C. KURTZ.